(12) United States Patent
Brisebois et al.

(10) Patent No.: US 9,161,356 B2
(45) Date of Patent: *Oct. 13, 2015

(54) FEMTO PARAMETER PROFILES BASED UPON NEARBY ACCESS POINT

(71) Applicants: AT&T Mobility II LLC, Atlanta, GA (US); AT&T Intellectual Property I, L.P., Atlanta, GA (US)

(72) Inventors: Arthur Brisebois, Cumming, GA (US); Thomas Wallace Henderson, Alpharetta, GA (US)

(73) Assignees: AT&T MOBILITY II LLC, Atlanta, GA (US); AT&T INTELLECTUAL PROPERTY I, L.P., Atlanta, GA (US)

(*) Notice: Subject to any disclaimer, the term of this patent is extended or adjusted under 35 U.S.C. 154(b) by 49 days.

This patent is subject to a terminal disclaimer.

(21) Appl. No.: 14/014,981

(22) Filed: Aug. 30, 2013

(65) Prior Publication Data
US 2013/0344882 A1 Dec. 26, 2013

Related U.S. Application Data

(63) Continuation of application No. 13/078,069, filed on Apr. 1, 2011, now Pat. No. 8,538,440.

(51) Int. Cl.
*H04W 36/00* (2009.01)
*H04W 72/04* (2009.01)
(Continued)

(52) U.S. Cl.
CPC ....... *H04W 72/0426* (2013.01); *H04L 41/0806* (2013.01); *H04W 24/02* (2013.01);
(Continued)

(58) Field of Classification Search
CPC ............. H04W 72/0426; H04W 24/02; H04L 41/0806; H04L 43/0823; H04L 43/16
USPC .................... 455/443, 435.1–435.3, 453, 436
See application file for complete search history.

(56) References Cited

U.S. PATENT DOCUMENTS

| 2009/0096835 A1 | 8/2009 | Ericsson et al. |
| 2010/0002603 A1 | 1/2010 | Gupta et al. |

(Continued)

FOREIGN PATENT DOCUMENTS

| WO | 2009/096835 | 8/2009 |

OTHER PUBLICATIONS

Claussen H et al: "An overview of the femtocell concept", Bell Labs Technical Journal, Wiley, CA, US, 1 vol. 1, No. 13, Mar. 21, 2008, pp. 221-245, XP001512256, ISSN: 1089-7089, DOI: 10.10021/BLTJ. 20292 p. 226.

(Continued)

*Primary Examiner* — Wayne Cai
(74) *Attorney, Agent, or Firm* — Amin, Turocy & Watson, LLP

(57) ABSTRACT

Operating parameters for a femto access point (FAP) are efficiently and accurately defined. During provisioning of the FAP, the system obtains operating parameters utilized by a nearby FAP expected to have a substantially similar radio environment as the provisioning FAP. Moreover, weighting is applied to the nearby FAP to determine which set of operating parameters to utilize at the provisioning FAP. Accordingly, pre-existing operating parameters, optimized by the nearby FAP are employed to augment initial network listen measurements performed at the provisioning FAP, and thus improve speed and accuracy of initial FAP parameter provisioning.

20 Claims, 11 Drawing Sheets

(51) Int. Cl.
  *H04L 12/24* (2006.01)
  *H04W 24/02* (2009.01)
  *H04L 12/26* (2006.01)
  *H04W 16/16* (2009.01)
  *H04W 52/24* (2009.01)
  *H04W 84/04* (2009.01)

(52) U.S. Cl.
  CPC .......... *H04L43/0823* (2013.01); *H04L 43/16* (2013.01); *H04W 16/16* (2013.01); *H04W 52/244* (2013.01); *H04W 84/045* (2013.01)

(56) References Cited

U.S. PATENT DOCUMENTS

2010/0027507 A1* 2/2010 Li et al. .................... 370/331
2010/0261467 A1   10/2010 Chou et al.
2010/0329132 A1* 12/2010 Raghothaman et al. ...... 370/252
2010/0329150 A1   12/2010 Nielsen

OTHER PUBLICATIONS

Vodafone: "Text proposals for TR 25.967—Home NodeB RF, chapter 7", 3GPP Draft; R4-090349, 3rd Generation Partnership Project (3GPP), Mobile Competence Centre; 650, Route Des Lucioles; F-06921 Sophia Antipolis Cedex; France, no. Ljubljana; Jan. 12, 2009, XP050326818, [retrieved on Jan. 12, 2009]7.4 HNB Self-configuration 7.4.4 HNB DL power setting.

International Search Report for PCT Patent Application No. US2012/029946 dated Jun. 27, 2012, 14 pages.

Office Action dated Jan. 9, 2013 for U.S. Appl. No. 13/078,069, 11 pages.

* cited by examiner

FEMTO PARAMETER PROFILES BASED UPON NEARBY ACCESS POINT

This application is a continuation of U.S. patent application Ser. No. 13/078,069, entitled "FEMTO PARAMETER PROFILES BASED UPON NEARBY ACCESS POINT" and filed on Apr. 1, 2011. The entirety of the above noted application is incorporated herein by reference.

TECHNICAL FIELD

The subject disclosure relates to wireless communications and, more particularly, to a mechanism that defines a femtocell operating parameter profile based on examples from nearby access points, which are likely to have a similar radio environment.

BACKGROUND

Femtocells—building-based wireless access points interfaced with a wired broadband network—are traditionally deployed to improve indoor wireless coverage, and to offload a mobility radio access network (RAN) operated by a wireless service provider. Improved indoor coverage includes stronger signal and improved reception (e.g., voice, sound, or data), ease of session or call initiation, and session or call retention as well. Offloading a RAN reduces operational and transport costs for the service provider since a lesser number of end users utilizes over-the-air radio resources (e.g., radio frequency channels), which are typically limited. Femtocells utilize a set of operating parameters that are typically obtained during the provisioning stage of the initial femtocell setup. Traditionally, the operating parameters are derived by employing a set of location and network listen measurements collected when the femto access point (FAP) is first powered up (e.g., initialization). Measured dominance (or not) of one or many macro cells can be used to determine parameters, such as, FAP transmission power, and which access parameters provide the best service area/interference mix for the femto service location. After initialization, measurements are repeated periodically (e.g., every night) and parameters are fine-tuned over time.

The traditional mechanism for obtaining femto operating parameters may have a long-term benefit, but the initial femto customer setup, performed during initialization has many limitations. For example, the initial network listen measurements and automatic parameter calculations substantially increase setup delay. Most often, it takes more than 15 minutes for the FAP to collect measurements, define parameters and activate its transmitter. In the meantime, the FAP transmitter is switched off and the customer is kept waiting. Another limitation of the traditional approach relates to accuracy. Moreover, radio network environments are too dynamic to be accurately represented by a single-shot network listen measurement taken during initialization. In an example, the customer can initially power the FAP when traffic on a surrounding macro network is particularly low. Interference measurements taken at this time can be overly optimistic, and result in channel, power and parameter selections, which are sub-optimal under normal loading conditions. Further, the installed location of the FAP can also lead to inaccuracy. For example, a FAP installed in an underground basement may receive much less interference during network listen, than an above-ground served user equipment (UE) would, when the FAP is activated. Accordingly, it can be beneficial to take more measurements over an extended period of time to improve accuracy. However, during this extended period of time the customer is either waiting with no FEMTO service, or dropping calls whilst the FAP is self-adjusting. This can lead to customer dissatisfaction and an unacceptably high rate of initial return of FAP equipment and/or disconnection of femto services.

DETAILED DESCRIPTION

Figure 1:
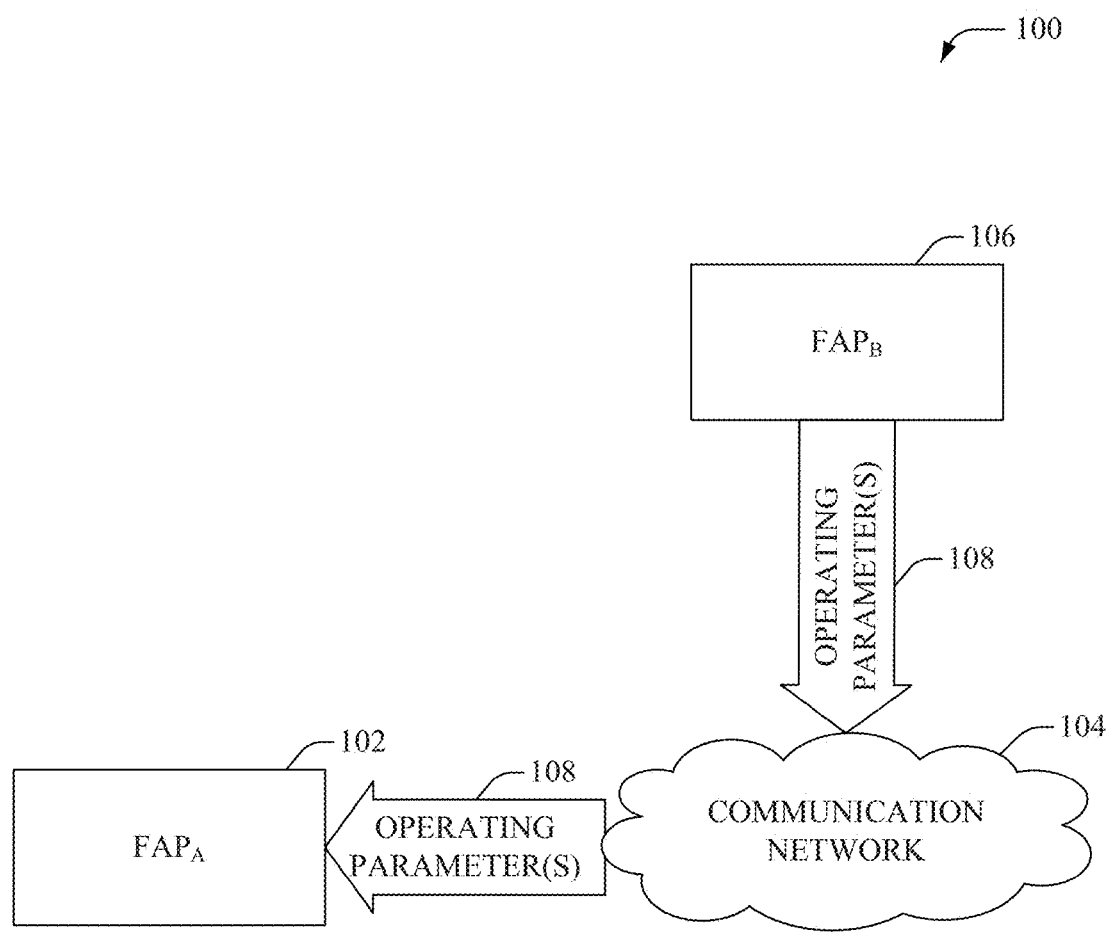
FIG. 1 illustrates an example system that facilitates selection of operating parameters during initialization of a femto access point (FAP).

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "platform," "service," "framework," "connector," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "mobile station," "mobile," subscriber station," "access terminal," "terminal," "handset," "mobile device," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth. In addition, the terms the terms "femtocell", and "femto" are utilized interchangeably, while "macro cell" and "macro" are utilized interchangeably herein.

A femtocell determines a set of operating parameters during an initialization stage, when a femto access point (FAP) is powered up. Conventional FAPs determine the operating parameters based on location and network listen measurements performed at initialization. However, the operating parameters selected based on these one-time initial measurements may not be accurate. Further, the selection process adds a significant delay time for start-up of the FAP (e.g., long wait to activate the femtocell) and the customer can experience problems during initial operation (e.g., poor call quality and/or dropped calls). The systems and methods disclosed herein select the operating parameters and/or define an operating parameter profile based upon examples received from nearby FAPs that are expected/likely to have similar macro radio conditions as the provisioning FAP. Weighting applied to the nearby FAPs can determine which set of femtocell operating parameter profiles can be employed. This can significantly improve the speed and accuracy of initial FAP operating parameter provisioning, leading to short start-up time and improved performance on start-up.

The systems and methods disclosed herein, in one aspect thereof, can facilitate utilizing operating parameters from a provisioned femtocell to accurately and efficiently configure a provisioning femtocell. Typically, during initialization (e.g., on power-up, reset, re-boot, etc.) of a first femto access point (FAP), the system can request operating parameters from a network node. The network node can search for the closest existing FAP, near the first FAP, that has adequate time and quality of service. Further, the network node can forward the operating parameters from the existing FAP to the first FAP. The first FAP can utilize the operating parameters of the existing FAP as an initial set and update the operating parameters at a later time, to better suit the surrounding environment of the first FAP.

Another aspect of the disclosed subject matter relates to a method that can be employed to facilitate improved startup operating parameters based on pre-optimized femtocells. The method includes activating a new femtocell and identifying a set of pre-optimized femtocells within a specified distance from the new femtocell. Further, the method includes filtering the set of pre-optimized femtocells based on various factors to select operating parameters of the set of pre-optimized femtocells that provide a best fit for the new femtocell. Moreover, the selected operating parameters can be employed by the new femtocell as a startup parameter set. Accordingly, the new femtocell can be provisioned faster and with a more optimal parameter set. Optimization efforts will also be minimal based on a better fit parameter set during initial provisioning.

Aspects, features, or advantages of the subject innovation can be exploited in substantially any wireless communication technology; e.g., Universal Mobile Telecommunications System (UMTS), General Packet Radio Service (GPS), Wi-Fi, Worldwide Interoperability for Microwave Access (WiMAX), Enhanced General Packet Radio Service (Enhanced GPRS), Third Generation Partnership Project (3GPP) Long Term Evolution (LTE), Third Generation Partnership Project 2 (3GPP2) Ultra Mobile Broadband (UMB), High Speed Packet Access (HSPA), or Zigbee. Additionally, substantially all aspects of the subject innovation can be exploited in legacy telecommunication technologies.

Referring initially to FIG. 1, there illustrated is an example system 100 that facilitates selection of operating parameters during initialization of a FAP, according to an aspect of the subject innovation. As an example, the operating parameters can include, but are not limited to, transmit power, frequency, handover thresholds, access parameters, and/or the like. Typically, system 100 facilitates setting operating parameters, for example, during provisioning of a $FAP_A$ 102, based on operating parameters received from a nearby $FAP_B$ 106.

In one aspect, operating parameters of $FAP_A$ 102 can be configured during a "configuration mode" of operation. Typically, upon an initial power up, $FAP_A$ 102 can be started in the configuration mode via a boot procedure. It is noted that the $FAP_A$ 102 can be configured in the configuration mode during an initial setup (e.g., subsequent to or concomitant with provisioning of $FAP_A$ 102); a predetermined and/or periodic schedule; or an event based instance (e.g., on reset, re-boot, etc.). It is further noted that the configuration mode of operation also can be initiated via an external interaction (e.g., a button actuation or press) of an agent (e.g., a subscriber, a technician, etc.) with $FAP_A$ 102. Moreover, a display interface on the $FAP_A$ 102 (e.g., light emitting diode (LED) lights or a message in a liquid crystal display (LCD) screen) can convey the configuration mode of operation via visual or aural indicia.

According to an embodiment, during the configuration mode, the $FAP_A$ 102 can request a set of initial operating parameters from a network node (not shown) in a communication network 104. As an example, the communication between the $FAP_A$ 102 and the communication network 104/network node can be routed through a backhaul broadband wired network. The backhaul broadband wired network can include an optical fiber backbone, twisted-pair line, T1/E1 phone line, DSL, coaxial cable, and/or the like. Alternately, (e.g., if the broadband modem is not set up, or broadband network is not connected, etc.), the $FAP_A$ 102 can communicate over a wireless network of the service provider, for example, by employing a neighboring macro base station or possibly another FAP (not shown).

On receiving a request from $FAP_A$ 102, the communication network 104 can identify a femtocell, $FAP_B$ 106 that has or is likely to have similar radio conditions as $FAP_A$ 102, for example, based on a distance between $FAP_A$ 102 and $FAP_B$ 106. Typically, $FAP_B$ 106 can be most any pre-provisioned FAP (e.g., in the vicinity of $FAP_A$ 102) deployed by the service provider. In one example, the $FAP_B$ 106 can utilize operating parameters 108 that have been determined based on initial network listen measurements and/or obtained from another FAP, and customized for the $FAP_B$ 106 over a period of time. Moreover, the operating parameters 108 of the $FAP_B$ 106 can be transferred to $FAP_A$ 102, via the communication network 104, to facilitate initial configuration of $FAP_A$ 102. Accordingly, system 100 utilizes pre-existing FAP operating parameters 108, for example, from $FAP_B$ 106, based upon zero or more cycles of optimization (e.g., performed periodically by $FAP_B$ 106), to augment initial network listen measurements for $FAP_A$ 102, which would otherwise take weeks/months to converge. The use of pre-existing operating parameters 108 also simplifies parameter management and optimization processes in $FAP_A$ 102.

After the initial setup, the $FAP_A$ 102 can continue to take routine network listen measurements, for example, periodically (e.g., every night), and fine-tune/customize/optimize the operating parameters accordingly. In one aspect, if the subsequent fine-tuned operating parameters cause degraded performance, the $FAP_A$ 102 can revert to the prior or initial set of operating parameters based upon the inclusion of reliable planning tool data (not shown). In addition, after the initial setup and/or fine-tuning, the operating parameters of $FAP_A$ 102 can be provided to a newly provisioned FAP (not shown) to improve the speed and accuracy of initial parameter provisioning at the newly provisioned FAP.

Figure 2:
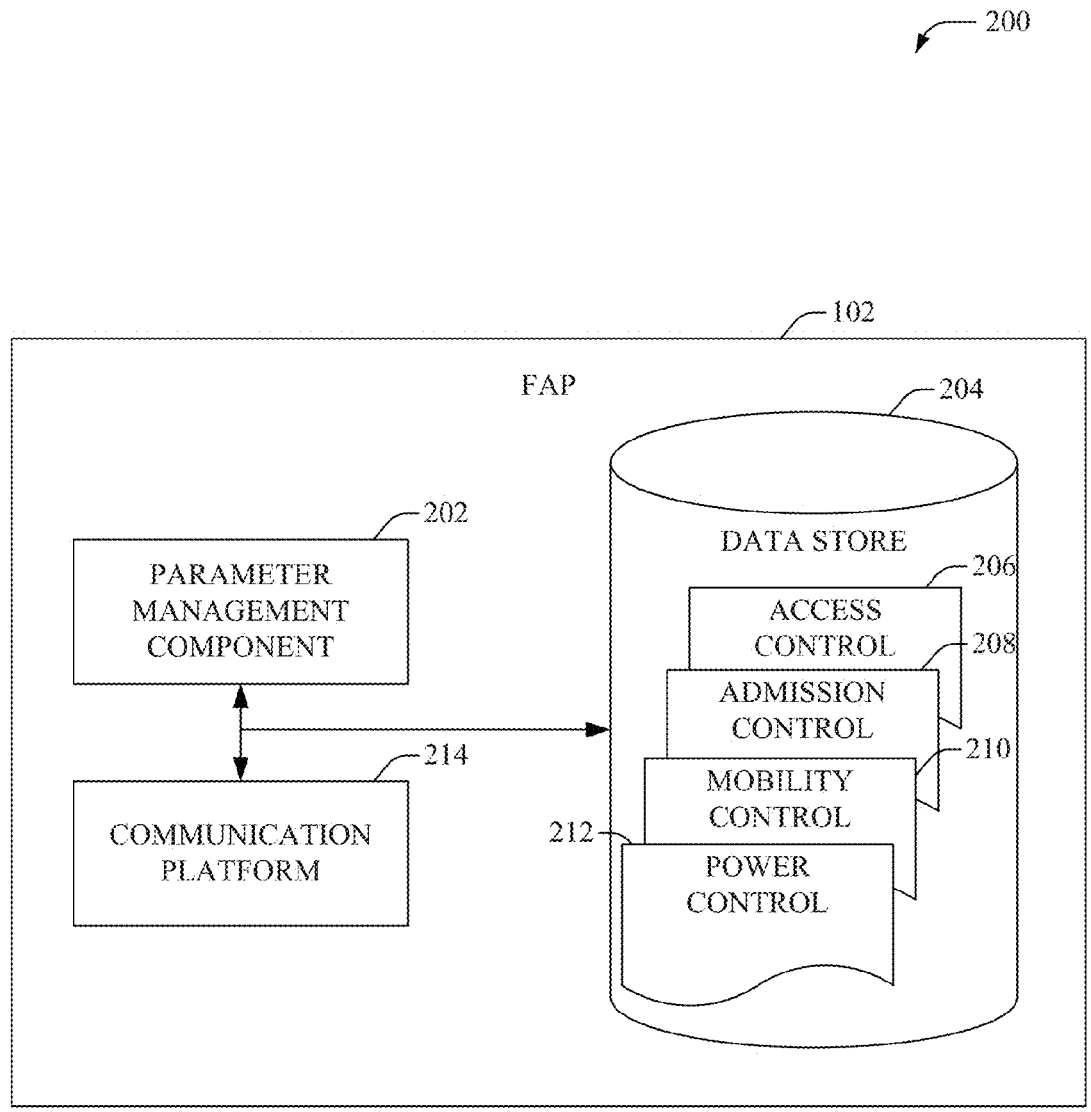
FIG. 2 illustrates an example system that can be employed for obtaining operating parameters for a femtocell.

Referring to FIG. 2, there illustrated is an example system 200 that can be employed for obtaining operating parameters for a femtocell in accordance with an aspect of the subject disclosure. It can be appreciated that the FAP 102 is substantially similar to $FAP_A$ 102, depicted in FIG. 1 and can include functionality, as more fully described herein, for example, with regard to system 100. Moreover, the FAP 102 can be connected to a network node (shown in FIG. 4) of a communication network through a broadband network and/or a surrounding macro/femto network.

According to an embodiment, FAP 102 can include a parameter management component 202 that obtains and/or updates operating parameters for FAP 102. Typically, on start-up and/or reset, the parameter management component 202 can query a network node (e.g., server) and receive a parameter profile comprising one or more operating parameters from the network node. In one aspect, the network node can indentify another FAP deployed by the service provider, which has similar radio conditions as the FAP 102. As an example, a FAP closest in distance to the FAP 102 can be selected. In another example, a FAP near FAP 102, with the most optimized set of operating parameters, can be selected. The network node can provide the operating parameters of the selected FAP to the FAP 102.

On receiving the operating parameters, the parameter management component 202 can store the parameters in a data store 204. As an example, the parameters can include, but are not limited to, access control parameters 206, admission control parameters 208, mobility control parameters 210, power control parameters 212, etc. Typically, the parameters (206-212) can include flexible or single value settings. For example, single value settings comprise, but are not limited to, Boolean values (e.g., true/false), specific values (e.g., "enabled," "disabled," "set," "reset," "on," "off," "high," "low," "enhanced," "shared," etc.), numeric values, etc. Further, "flexible" parameters comprise, but are not limited to, numerical ranges, thresholds (e.g., maximum radio frequency (RF) power, etc.), and/or time specific values, etc.

Access control parameters 206 can specify mechanisms for the FAP 102 to control access (e.g., accept and reject connection requests). Admission control parameters 208 can specify how bandwidth and/or latency are allocated to streams with various requirements in the femtocell. Further, mobility control parameters 210 can specify handover thresholds (e.g., for handovers between macro cell and femtocell) and/or most any factors associated with mobility control. Furthermore, the power control parameters 212 can specify femtocell uplink/downlink power, pilot power, maximum radio frequency (RF) power, etc. In addition, the parameter management component 202 can receive and store (in data store 204), most any operating parameters, such as but not limited to uplink/downlink frequency, scrambling codes, femtocell receiver gain, UE uplink power, Adjacent Channel Selectivity (ACS) of the femtocell receiver, blocking performance of the femtocell receiver, etc.

Typically, the data store 204 can reside within the FAP 102, and/or be operatively connected to the FAP 102. It can be appreciated that the data store 204 can include volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory (e.g., data stores, databases) of the subject systems and methods is intended to comprise, without being limited to, these and any other suitable types of memory.

Referring back to FIG. 2, the parameter management component 202 and data store 204 can be functionally coupled to a communication platform 214, which provides means to convey and receive attachment signaling, such as Location Area Update (LAU) and/or Routing Area Update (RAU) signaling. In addition, communication platform 214 can detect and measure attachment-signaling activity. Moreover, the communication platform 214 can utilize the operating parameters (206-212) during femtocell operation. For example, the communication platform 214 can specify various settings, such as, but not limited to, femtocell uplink/downlink power/frequency, femtocell receiver gain, UE uplink power, ACS of the femtocell receiver, blocking performance of the femtocell receiver, etc., based on the operating parameters (206-212) stored in data store 204. Accordingly, the system 200 can store operating parameters received from a nearby FAP, and quickly provision the FAP 102, during the configuration mode, with a more optimal parameter set. Moreover, optimization efforts are minimal based on a better fit parameter set at start-up (during initial provisioning).

Figure 3:
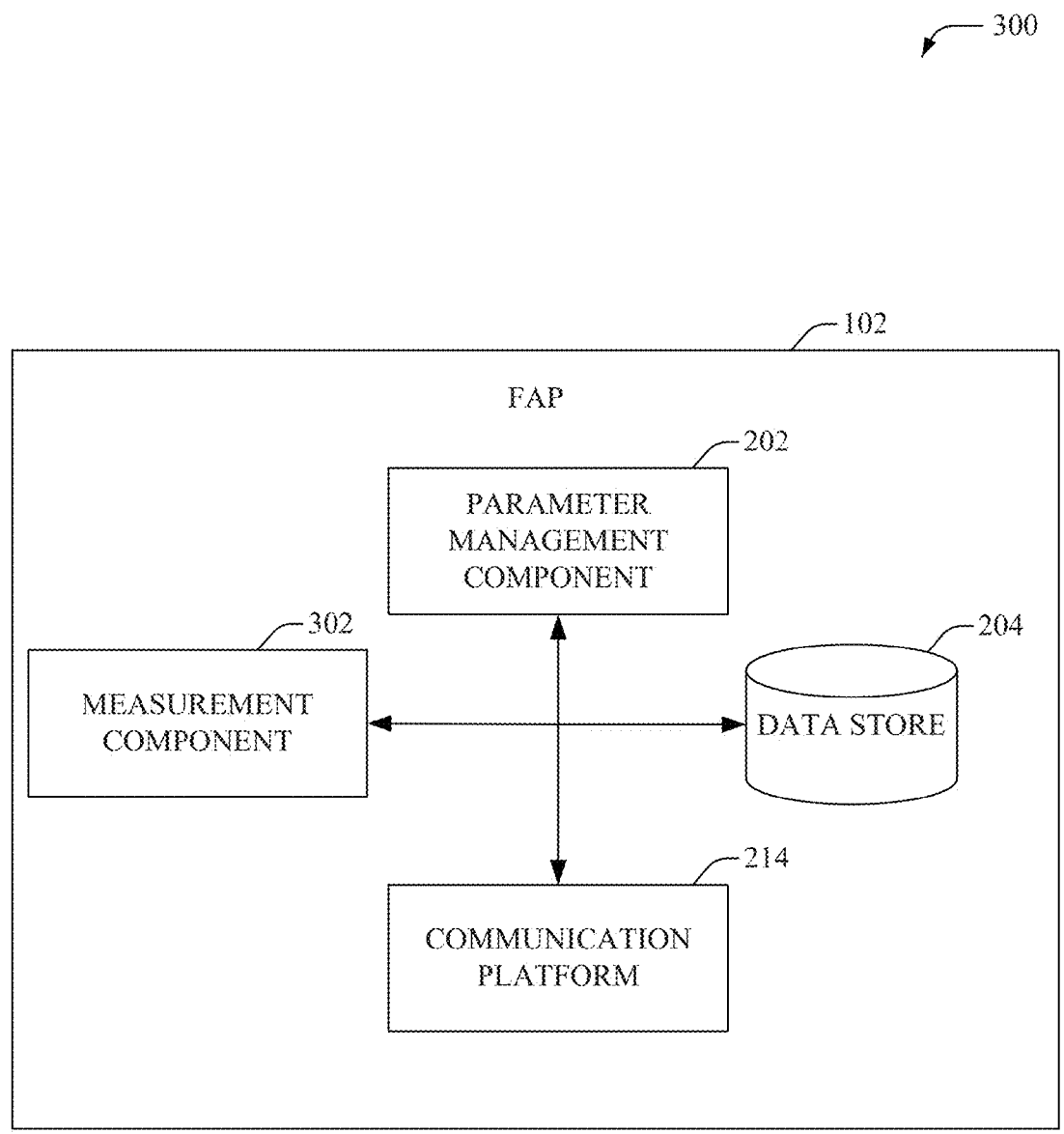
FIG. 3 illustrates an example system that can be employed to update the operating parameters of a femtocell.

Referring now to FIG. 3, there illustrated is an example system 300 that can be employed to update the operating parameters of a femtocell, according to an aspect of the subject disclosure. In general, the femtocell can be served by FAP 102 that facilitates communication and manages femto access. As an example, the FAP 102 can be deployed in most any location, such as, but not limited to, a home, a workshop, an office, an airport, a library, a hospital, a retail store, salon, grocery store, etc. It can be appreciated that the FAP 102, parameter management component 202, data store 204 and communication platform 214 can include functionality, as more fully described herein, for example, with regard to system 200.

As described previously with respect to system 200, during a configuration mode, the FAP 102 can be provisioned with an initial set of operating parameters received from a nearby FAP (that has already been provisioned). Typically, the terms "nearby FAP" as used herein can refer to a FAP that is in close proximity and/or within a specific distance from the FAP 102. Additionally or alternately, the nearby FAP can be most any FAP having a substantially similar surrounding radio environment as the FAP 102. According to an aspect, system 300 can be utilized to optimize the initial set of operating parameters and tune/customize them based on the surrounding environment of the FAP 102. Accordingly, a measurement component 302 is employed to collect location and/or network listen measurements for optimizing the initial set of operating parameters (e.g., received from the nearby FAP). In one aspect, the measurement component 302 can determine dominance/interference (or not) of one or more macro cells surrounding the FAP 102. Typically, the measurement component can be activated periodically (e.g., every night, weekly, bi-weekly, etc.), at a predefined time, and/or on user demand (e.g., service provider, technician, and/or customer activation).

Moreover, the measurement component 302 can sense the radio environment surrounding the FAP 102 to identify signal strengths of neighboring cells. During the network listen measurements, the measurement component 302 can listen to the broadcast and control channels of a base station in the vicinity of FAP 102, and identify the estimated signal strengths and/or path losses. Additionally or alternately, the measurement component 302 can broadcast information that can be received by neighboring base stations—either femtocells or macro cells, and facilitate a message exchange to improve performance and/or reduce interference. The measurement data identified by the measurement component 302 can be employed by the parameter management component 202 to update the set of operating parameters, which in turn can enable the FAP 102 to adjust its settings accordingly. For example, the FAP 102 via the communication platform 214 can adjust parameters, such as, but not limited to, power levels (e.g. to minimize interference). In another example, the communication platform 214 can determine how much FAP power, and/or which access parameters provide the best service area/interference mix for the FAP 102. Accordingly, one or more operating parameters can be modified based on self-optimization by employing the measurement component 302, resulting in an improved fit parameter set for a specific radio environment.

In one aspect, the measurement component 302 can also determine and/or store values for various factors associated with degraded performance, such as, but not limited to, dropped calls, failed handovers and the like. The parameter management component 202 can also employ these factors while updating the operating parameters. In one aspect, if any of the subsequent fine-tuned operating parameters cause degraded performance, the parameter management component 202 can revert to the prior or initial set of operating parameters, for example, received from the nearby FAP or a default set of operating parameters. In yet another aspect, after the operating parameters are optimized/fine-tuned, the parameter management component 202 can provide the subsequent fine-tuned operating parameters to a network node for delivery to a non-provisioned FAP, in response to a request from the network node.

Figure 4:
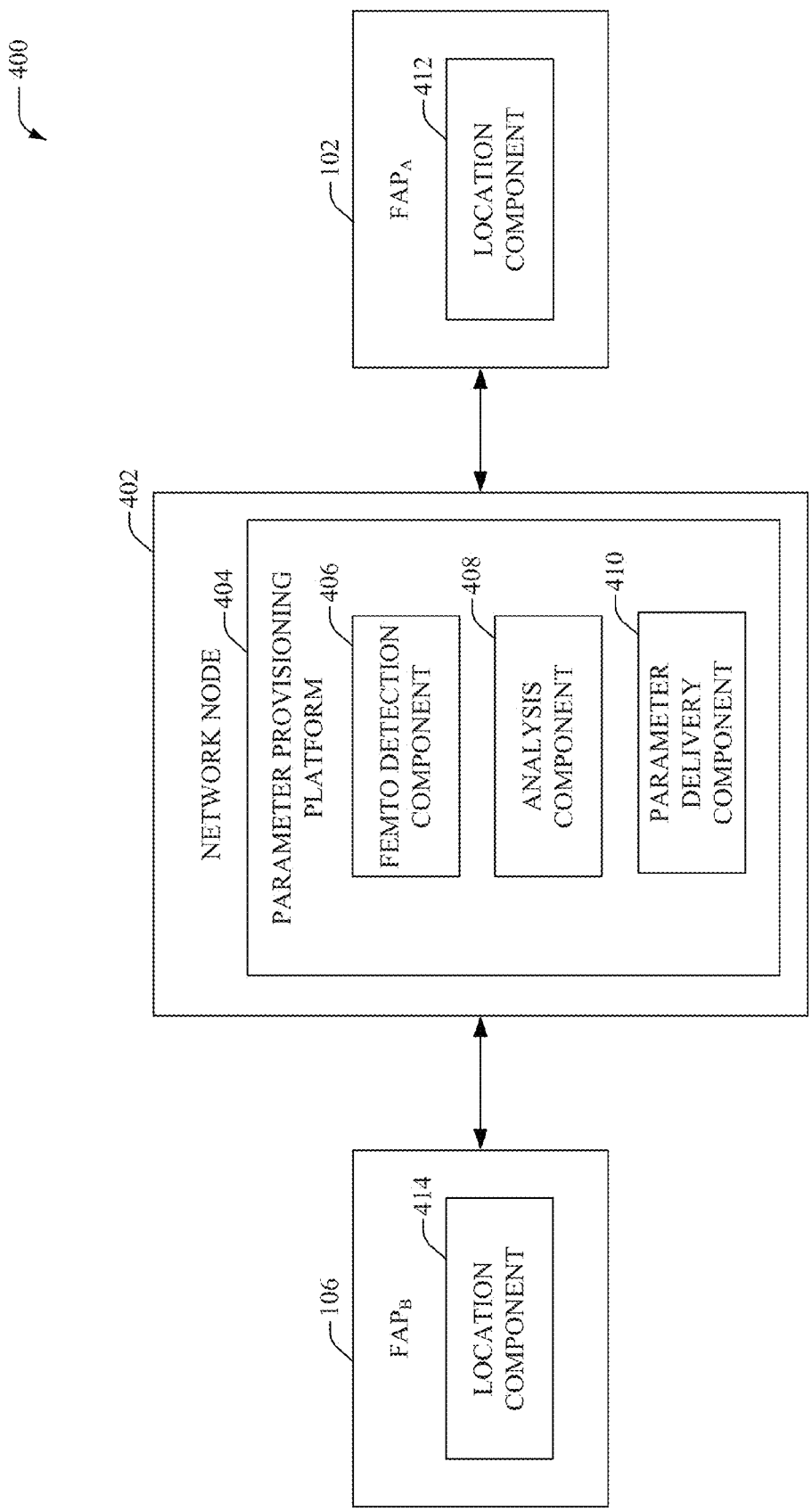
FIG. 4 illustrates an example system that exchanges an operating parameter profile between nearby femtocells.

FIG. 4 illustrates an example system 400 that exchanges an operating parameter profile between nearby femtocells, according to an aspect of the subject innovation. Moreover, system 400 improves the speed and accuracy of initial FAP parameter provisioning by employing pre-utilized operating parameters. In this example scenario, $FAP_A$ 102 is a non-provisioned FAP in a configuration mode, for example, at start-up, power-up, reset, etc. During the configuration mode, $FAP_A$ 102 can request (e.g., by employing a parameter management component 202) an initial set of operating parameters from a network node 402 (e.g., an auto configuration server). As an example, communication between $FAP_A$ 102 and the network node 402 can employ a wired backhaul network connected to the $FAP_A$ 102 and/or wireless communication via a surrounding macro and/or femtocell. It can be appreciated that the $FAP_A$ 102 and $FAP_B$ 106 can include functionality, as more fully described herein, for example, with regard to systems 100-300.

According to an aspect, the network node 402 can include a parameter provisioning platform 404 for providing a set of operating parameters for provisioning a femtocell. On receiving a request for operating parameters from the $FAP_A$ 102, the parameter provisioning platform 404 can indentify a set of FAPs that are within a specific distance from the $FAP_A$ 102, by employing a femto detection component 406. In one aspect the femto detection component 406 can identify a location of the $FAP_A$ 102. As an example, a location component 412 can provide a location, e.g., a physical address, geographical co-ordinates, a postal address, etc. Moreover, the location component 412 can determine location information by employing most any standard network assisted location procedures. For example, the location component 412 can determine the location information by communicating with one or more neighboring macro base stations, by determining offset information and the location of the neighboring base station(s).

Additionally or alternatively, the location component 412 can include a Global Positioning Satellite (GPS) receiver, which can be utilized to identify GPS co-ordinates of the $FAP_A$ 102. Further, in another example, a customer can be requested to manually enter location information via a user interface coupled to the $FAP_A$ 102. In yet another example, location information can be obtained by the location component 412 and/or the femto detection component 406, from a subscriber database/web server within the communication network, based on an identity of the $FAP_A$ 102 and/or the customer.

On determining the location of the $FAP_A$ 102, the femto detection component 406 can identify a set of FAPs that are deployed within similar radio environments as $FAP_A$ 102. In an aspect, the femto detection component 406 can determine a set of FAPs that are within a predefined distance (e.g., nearby) from the $FAP_A$ 102. For example, the femto detection component 406 can receive location information from location components (e.g., location component 414) of various FAPs (e.g., $FAP_B$ 106) deployed by the service provider and/or the subscriber database, and can calculate a distance between the $FAP_A$ 102 and the various FAPs. Typically, the femto detection component 406 can utilize most any technique to identity a set of FAPs that are deployed within a radio environment that is substantially similar to the radio environment of $FAP_A$ 102.

Further, the parameter provisioning platform 404 can include an analysis component 408 that can filter the set of FAPs to select a single FAP (e.g., $FAP_B$ 106) that has the most similar radio conditions as $FAP_A$ 102. In particular, the analysis component 408 can determine which of the set of FAPs identified by the femto detection component 406 have been pre-optimized and/or determine a level of optimization for each of the set of FAPs. Moreover, the analysis component 408 can filter the pre-optimized FAPs based on various factors, such as, but not limited to, performance, call handling capability, call failure rate, network listen results, best performing femtocells based on performance (PM) counters, number of registration attempts based on PM counters, etc. In one example, the analysis component 408 can select a FAP (e.g., $FAP_B$ 106) whose parameters have the high level of optimization (e.g. greater than a predefined threshold). Moreover, the analysis component 408 can determine a FAP (e.g., $FAP_B$ 106) that provides a best fit and has the most similar radio conditions as $FAP_A$ 102. It can be appreciated that the analysis component 408 can utilize most any suitable logic and/or policies, to identify the FAP. In one example, the analysis component 408 can select a first FAP that is further away from $FAP_A$ 102 than a second FAP, if the operating parameters of the first FAP have been optimized to a greater extent than those of the second FAP.

In addition, the analysis component 408 can also categorize the $FAP_A$ 102 within one of a number of pre-provisioned service area and parameter profiles. For example, the $FAP_A$ 102 can be categorized as "multiple dominant macro," if many strong predicted and measured macro signals exist near the location of the $FAP_A$ 102. In this example scenario, the analysis component 408 can determine that the $FAP_A$ 102 can require high femto transmission power and/or high thresholds for handout. In another example, the $FAP_A$ 102 can be categorized as "low macro dominance," if low predicted and measured macro signals exist near the location of the $FAP_A$ 102, and it can be determined by the analysis component 408 that the $FAP_A$ 102 can utilize low femto transmission power and/or low thresholds for handout. It can be appreciated that the above profiles are just a few examples and the number of potential profiles and criterion is relatively limitless. In general, the analysis component 408 can identify a FAP (e.g., $FAP_B$ 106) that provides a best fit for $FAP_A$ 102, based on an analysis of location information, optimization levels, and/or parameter profiles.

Typically, the FAP (e.g., $FAP_B$ 106) identified by the analysis component 408 can have operating parameters that have been optimized over a significant period of time (e.g., weeks, moths, years) before the $FAP_A$ 102 is configured. Thus, the accuracy of operating parameters deployed in pre-existing/pre-provisioned $FAP_B$ 106 can be an order of magnitude better than those the $FAP_A$ 102 can derive on its own during an initial measurement. Accordingly, the parameter provisioning platform 404 can utilize a parameter delivery component 410 to transfer a set of operating parameters from $FAP_B$ 106 to $FAP_A$ 102. As an example, the parameter delivery component 410 can retrieve one or more operating parameters (selected by analysis component) from a data store of $FAP_B$ 106 and provide the one or more operating parameters to $FAP_A$ 102 for storage and utilization. In this regard, $FAP_A$ 102 will provision quicker and with a more optimal parameter set.

Figure 5:
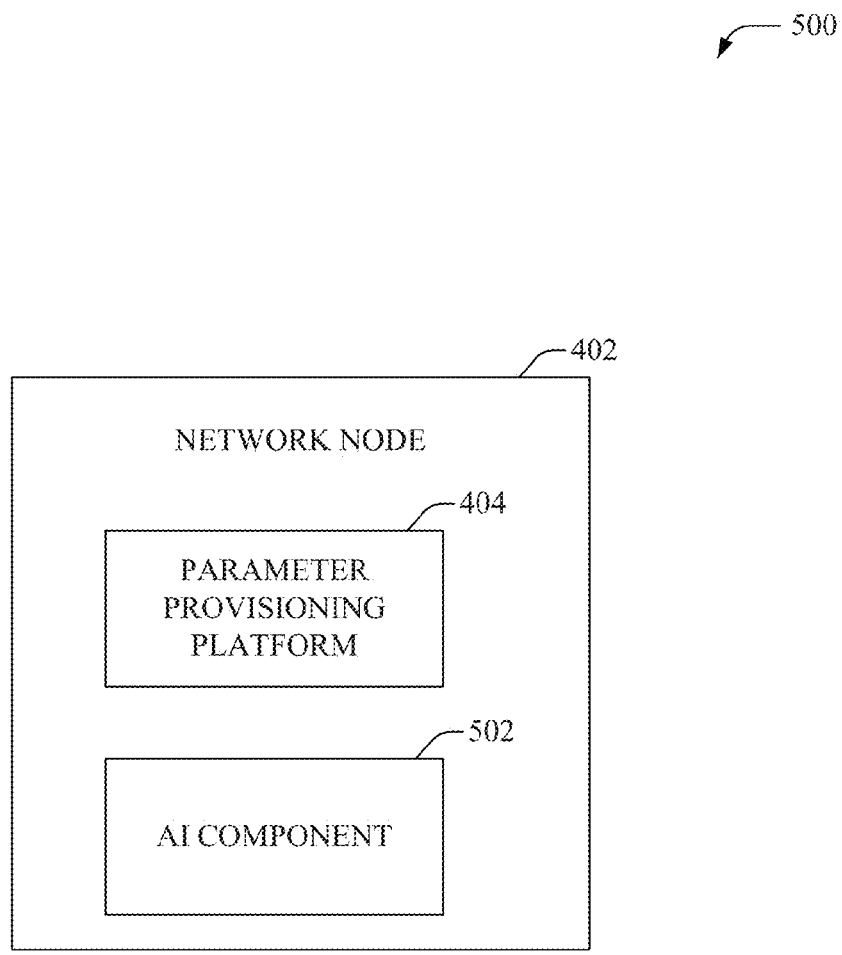
FIG. 5 illustrates an example system that facilitates automating one or more features in accordance with the subject innovation.

FIG. 5 illustrates an example system 500 that employs an artificial intelligence (AI) component 502, which facilitates automating one or more features in accordance with the subject innovation. It can be appreciated that the network node 402 and the parameter provisioning platform 404 can include respective functionality, as more fully described herein, for example, with regard to system 400. Additionally, although the AI component 502 is depicted to reside within the network node 402, it can be appreciated that the AI component 502 can be externally connected to the network node 402.

The subject innovation (e.g., in connection with selecting operating parameters for a new FAP) can employ various AI-based schemes for carrying out various aspects thereof. For example, a process for selecting a previously provisioned FAP, and/or selecting operating parameters from one or more previously provisioned FAPs, can be facilitated via an automatic classifier system and process. Moreover, the classifier can be employed to determine which previously provisioned FAP can be utilized, which operating parameters can be selected from the selected FAP, the surrounding radio environment of the new FAP, etc.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of communication systems, for example, attributes can be information stored in a database (e.g., location information, subscriber information, network provider policies, etc.), and the classes can be categories or areas of interest (e.g., levels of optimization/priorities).

A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject innovation can employ classifiers that are explicitly trained (e.g., via a generic training data) as well as implicitly trained (e.g., via observing UE behavior, femtocell operation, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria which femtocell is likely to have the most similar set of radio conditions to those of a newly set-up femtocell, which operating parameters can be selected from which previously provisioned FAP, etc. The criteria can include, but is not limited to, historical patterns, FAP performance data, user preferences, service provider preferences and/or policies, location of the FAPs, etc.

Figure 6:
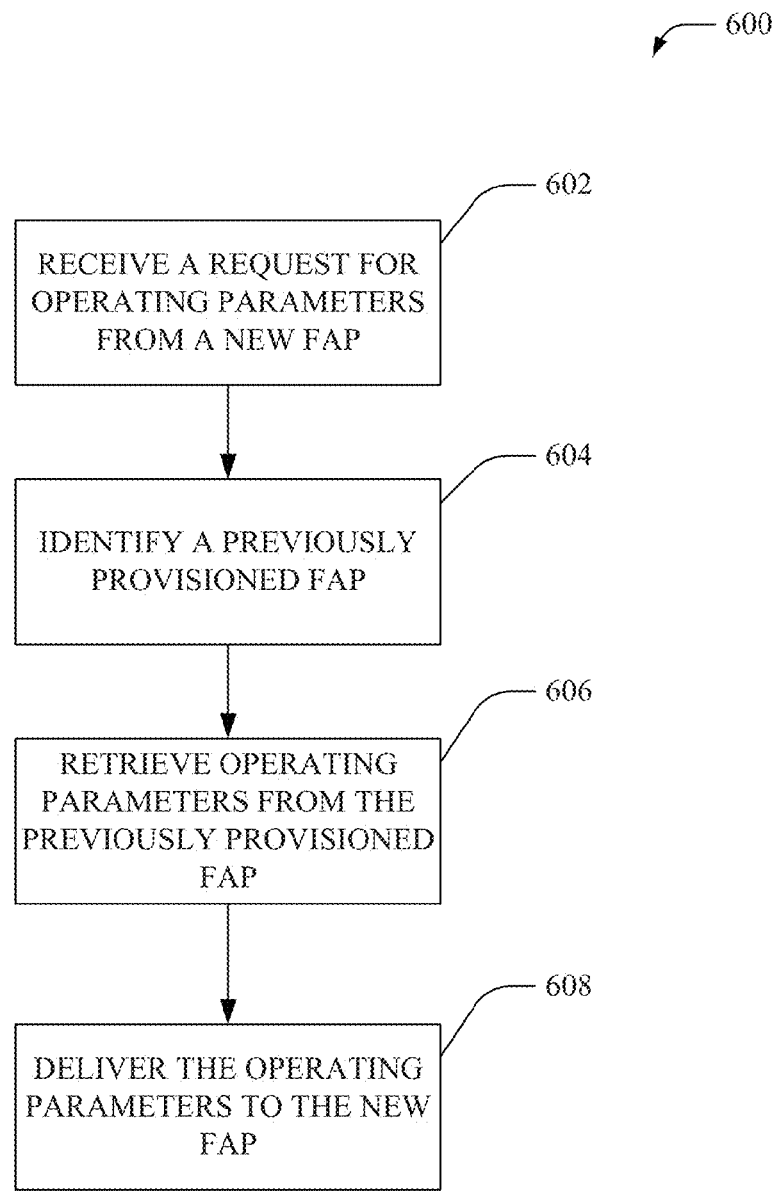
FIG. 6 illustrates an example methodology that can be utilized to facilitate improved speed and accuracy of initial femtocell provisioning.
Figure 7:
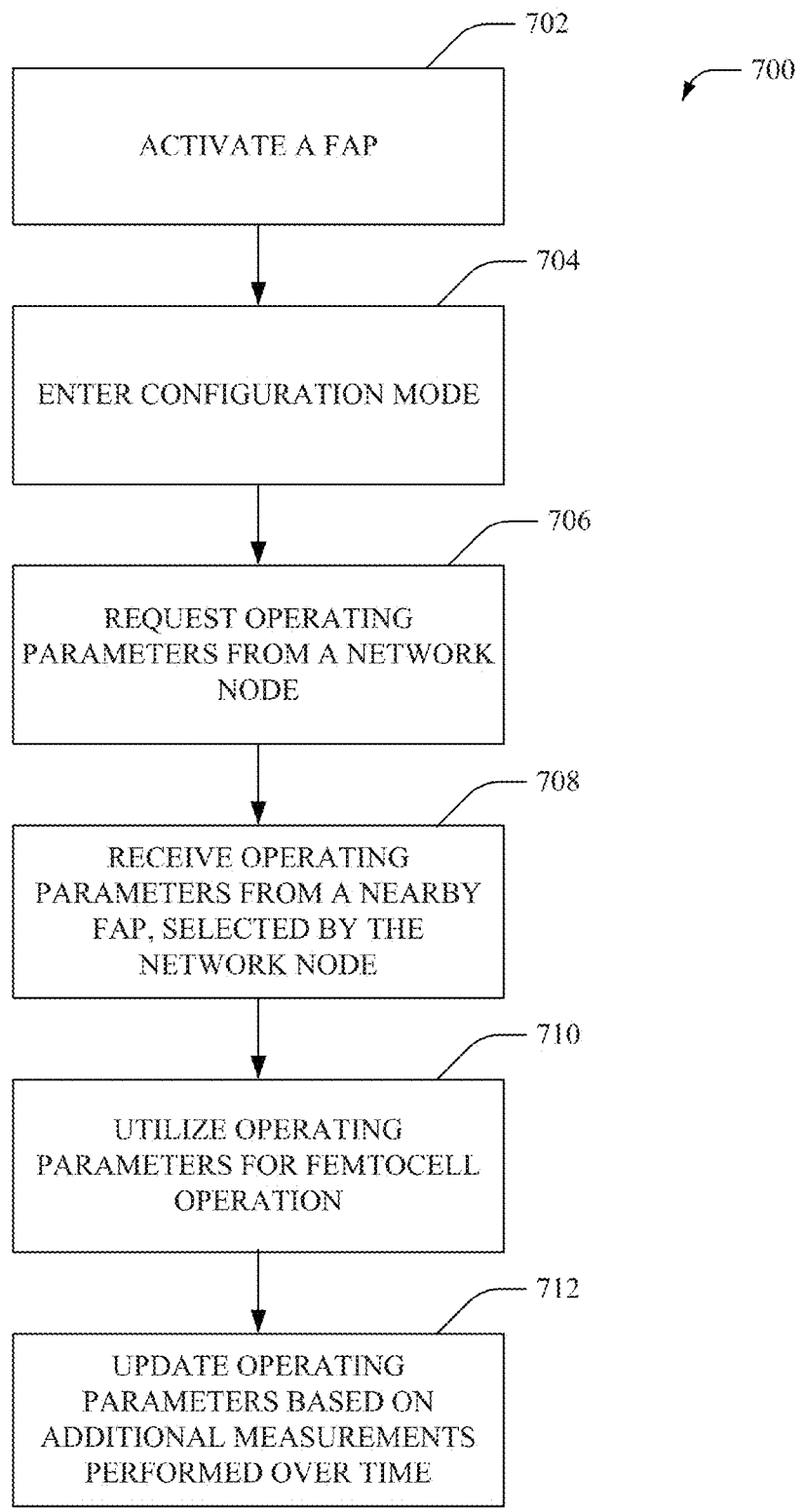
FIG. 7 illustrates an example methodology that facilitates efficient and accurate femtocell provisioning.

FIGS. 6-7 illustrate methodologies and/or flow diagrams in accordance with the disclosed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device or computer-readable storage/communications media.

Referring now to FIG. 6, illustrated is an example methodology 600 that can be utilized to facilitate improved speed and accuracy of initial femtocell provisioning, according to an aspect of the subject specification. Typically, on start-up, re-boot, power-up, etc., a newly deployed FAP can operate in a configuration mode that facilitates selection of operating parameters for the femtocell. In general, methodology 600 facilitates defining a femtocell operating parameter profile for the FAP in the configuration mode, based upon examples from a nearby FAP expected to have similar macro radio conditions.

At 602, a request for operating parameters can be received from a new FAP. The terms "new FAP" as used herein refers to a FAP in a configuration mode, for example, that has not been provisioned. At 604, a previously provisioned FAP can be identified. In one example, the previously provisioned FAP can be within a specified distance from the new FAP. In another example, the previously provisioned FAP can have similar radio conditions/operating profile classification as that of the new FAP. In yet another example, the operating parameters utilized by the previously provisioned FAP can be optimized above a certain level of optimization and/or for more than a specified amount of time (e.g., more than one week, one month, etc.). Moreover, weighting applied to the previously provisioned FAP can help determine which set of femtocell operating parameter profiles can be utilized.

At 606, operating parameters utilized by the previously provisioned FAP can be retrieved. Further, at 608, the operating parameters can be delivered to the new FAP, via wired and/or wireless communication. Moreover, the new FAP does not need to waste time collecting network listen measurements during start-up and can be quickly provisioned by employing the operating parameters from the previously provisioned FAP. Additionally, the operating parameters from the previously provisioned FAP enable the new FAP to quickly converge to an optimal set of operating parameters, for example, derived from a periodic self-optimization process.

FIG. 7 illustrates an example methodology 700 that facilitates efficient and accurate femtocell provisioning in accordance with an aspect of the subject specification. In particular, methodology 700 provides a mechanism to utilize pre-existing FAP operating parameters, which have been determined/optimized based upon many cycles of optimization, to augment initial network listen measurements in a newly deployed FAP.

At 702, the FAP can be activated. Typically, activation can occur when the FAP is powered on (e.g., after power goes out, at setup, when rebooted, etc.). At 704, a configuration mode is entered. Moreover, the FAP is provisioned during the configuration mode by setting operating parameters (e.g., access control, admission control, mobility, and/or power control parameters). Further, at 706, operating parameters are requested from a network node (e.g., auto configuration server). In one aspect, the network node identifies a set of pre-optimized FAPs that are located within a predefined geographical distance from the activated FAP, and selects operating parameters from the set of pre-optimized FAPs that provide a best fit for the activated FAP. At 708, the operating parameters from a nearby (e.g., within the predefined geographical distance) FAP, selected by the network node, are received (e.g., over wired and/or wireless communication). Moreover, at 710, the operating parameters are utilized for femtocell operation. In addition, at 712, the operating parameters are updated based on additional measurements performed over time. For example, each night, network listen measurements are repeated and operating parameters are optimized/fine-tuned to best suit the specific radio environment of the activated FAP.

Figure 8:
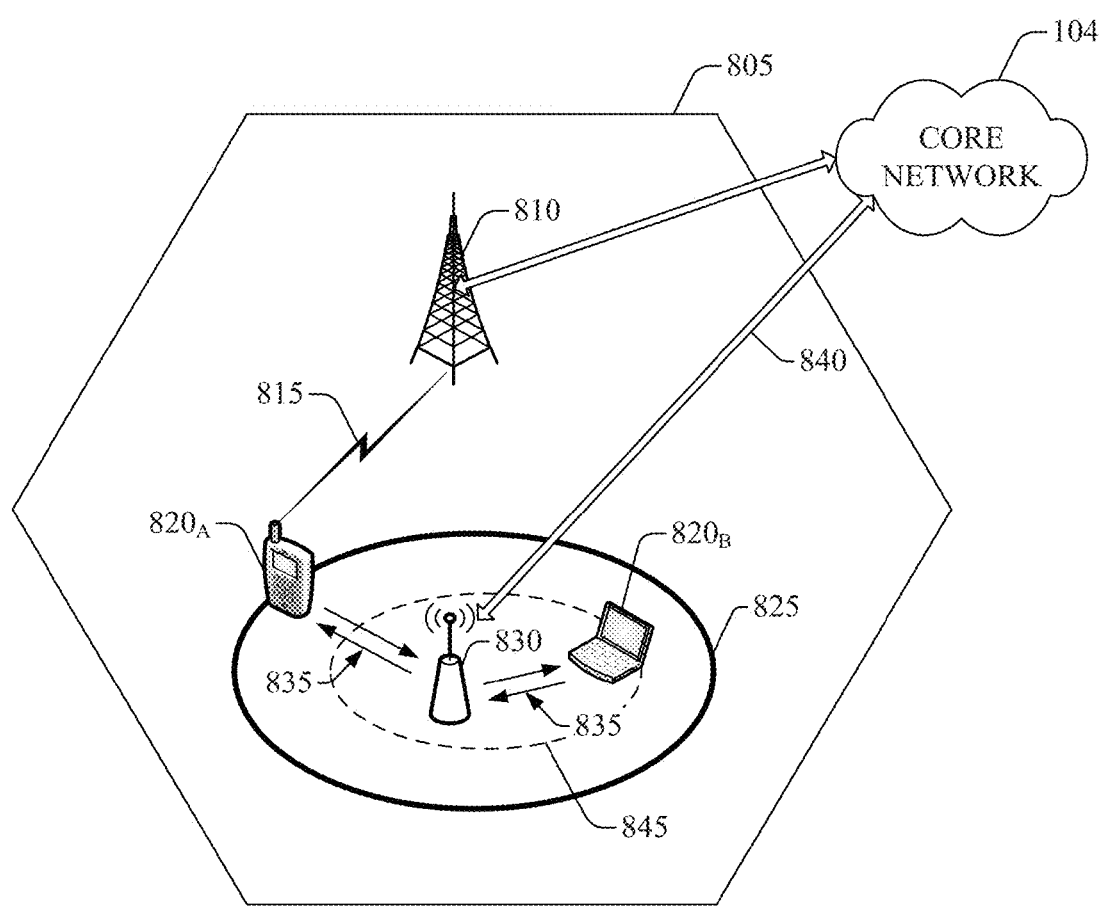
FIG. 8 illustrates an example wireless communication environment with associated components for operation of a femtocell in accordance with the subject specification.

FIG. 8 illustrates a schematic wireless environment 800 (e.g., a network) in which a femtocell can exploit various aspects of the subject innovation in accordance with the disclosed subject matter. In wireless environment 800, area 805 can represent a coverage macro cell, which can be served by base station 810. Macro coverage is generally intended for outdoors locations for servicing mobile wireless devices, like UE $820_A$, and such coverage is achieved via a wireless link 815. In an aspect, UE 820 can be a 3GPP Universal Mobile Telecommunication System (UMTS) mobile phone.

Within macro coverage cell 805, a femtocell 845, served by a femto access point 830, can be deployed. A femtocell typically can cover an area 825 that is determined, at least in part, by transmission power allocated to FAP 830, path loss, shadowing, and so forth. Coverage area typically can be spanned by a coverage radius that ranges from 20 to 50 meters. Confined coverage area 845 is generally associated with an indoors area, or a building, which can span about 5000 sq. ft. Generally, FAP 830 typically can service a number (e.g., a few or more) wireless devices (e.g., subscriber station $820_B$) within confined coverage area 845. In an aspect, FAP 830 can integrate seamlessly with substantially any PS-based and CS-based network; for instance, FAP 830 can integrate into an existing 3GPP Core via conventional interfaces like Iu-CS, Iu-PS, Gi, Gn. In another aspect, FAP 830 can exploit high-speed downlink packet access in order to accomplish substantive bitrates. In yet another aspect, FAP 830 has a LAC (location area code) and RAC (routing area code) that can be different from the underlying macro network. These LAC and RAC are used to identify subscriber station location for a variety of reasons, most notably to direct incoming voice and data traffic to appropriate paging transmitters.

As a subscriber station, e.g., UE $820_A$, can leave macro coverage (e.g., cell 805) and enters femtocell coverage (e.g., area 825), as illustrated in environment 800, a carrier frequency scan can be triggered by the UE $820_A$, which can detect the FAP 830. UE $820_A$ can attempt to attach to the FAP 830 through transmission and reception of attachment signaling, effected via a FL/RL 835; in an aspect, the attachment signaling can include a Location Area Update (LAU) and/or Routing Area Update (RAU). Attachment attempts are a part of procedures to ensure mobility, so voice calls and sessions can continue even after a macro-to-femto transition or vice versa. It is to be noted that UE 820 can be employed seamlessly after either of the foregoing transitions. Femto networks are also designed to serve stationary or slow-moving traffic with reduced signaling loads compared to macro networks. A femto service provider (e.g., an entity that commercializes, deploys, and/or utilizes FAP 830) therefore can be inclined to minimize unnecessary LAU/RAU signaling activity at substantially any opportunity to do so, and through substantially any available means. It is to be noted that substantially any mitigation of unnecessary attachment signaling/control can be advantageous for femtocell operation. Conversely, if not successful, UE 820 generally can be commanded (through a variety of communication means) to select another LAC/RAC or enter "emergency calls only" mode. It is to be appreciated that this attempt and handling process can occupy significant UE battery, and FAP capacity and signaling resources as well.

When an attachment attempt is successful, UE 820 can be allowed on femtocell 825 and incoming voice and data traffic can be paged and routed to the subscriber station through the FAP 830. It is to be noted also that data traffic is typically routed through a backhaul broadband wired network backbone 840 (e.g., optical fiber backbone, twisted-pair line, T1/E1 phone line, DSL, or coaxial cable). It is to be noted that as a FAP 830 generally can rely on a backhaul network backbone 840 for routing and paging, and for packet communication, substantially any quality of service can handle heterogeneous packetized traffic. Namely, packet flows established for wireless communication devices (e.g., terminals $820_A$ and $820_B$) served by FAP 830, and for devices served through the backhaul network pipe 840. According to one aspect, during the provisioning of FAP 830, parameters for operation of the femtocell 825 can be collected by the core communication network 104 from a nearby FAP (not shown) and provided to the FAP 830, via the backhaul network pipe 840 and/or the macro coverage cell 805.

Figure 9:
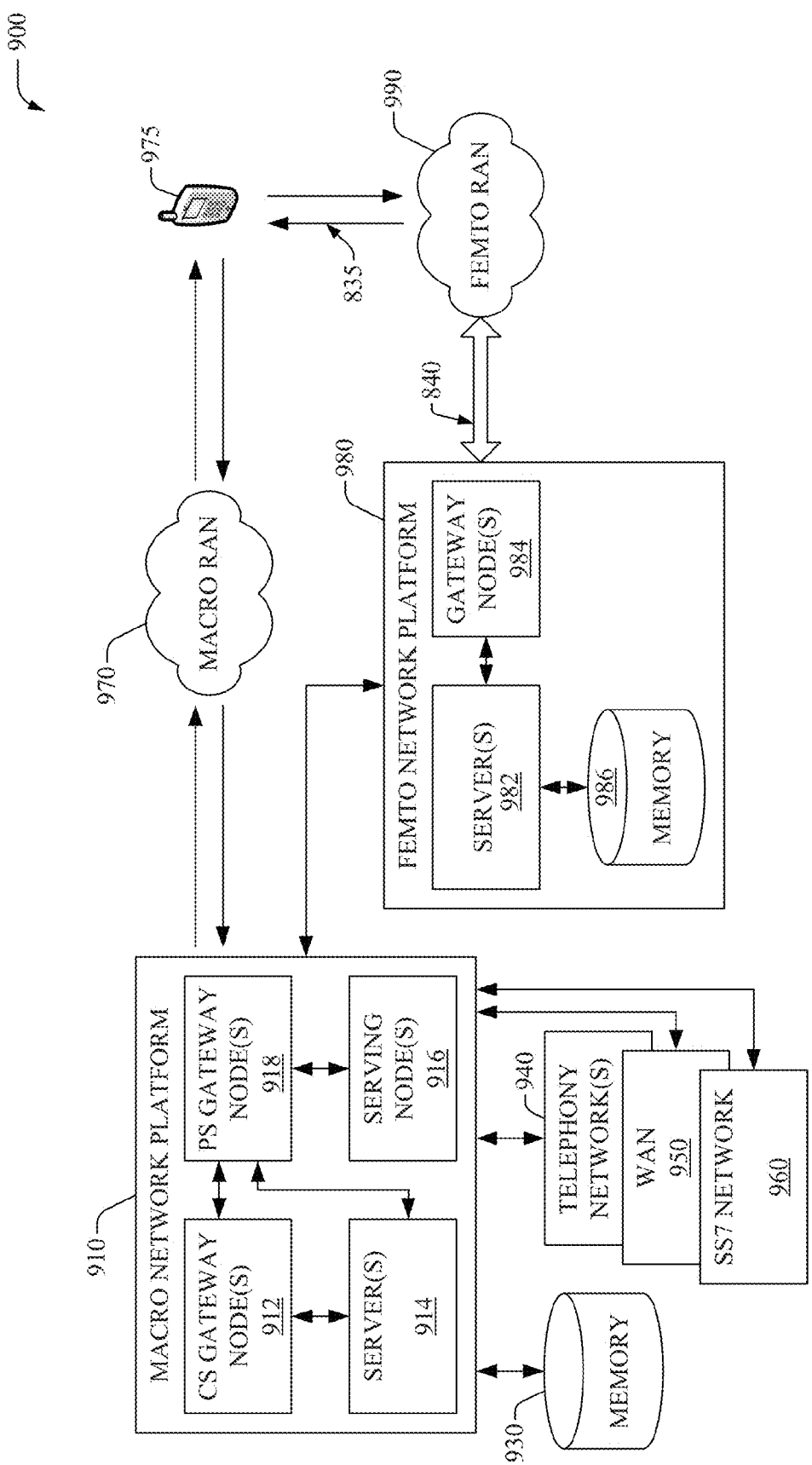
FIG. 9 illustrates a schematic deployment of a macro cell and a femtocell for wireless coverage in accordance with aspects of the disclosure.
Figure 10:
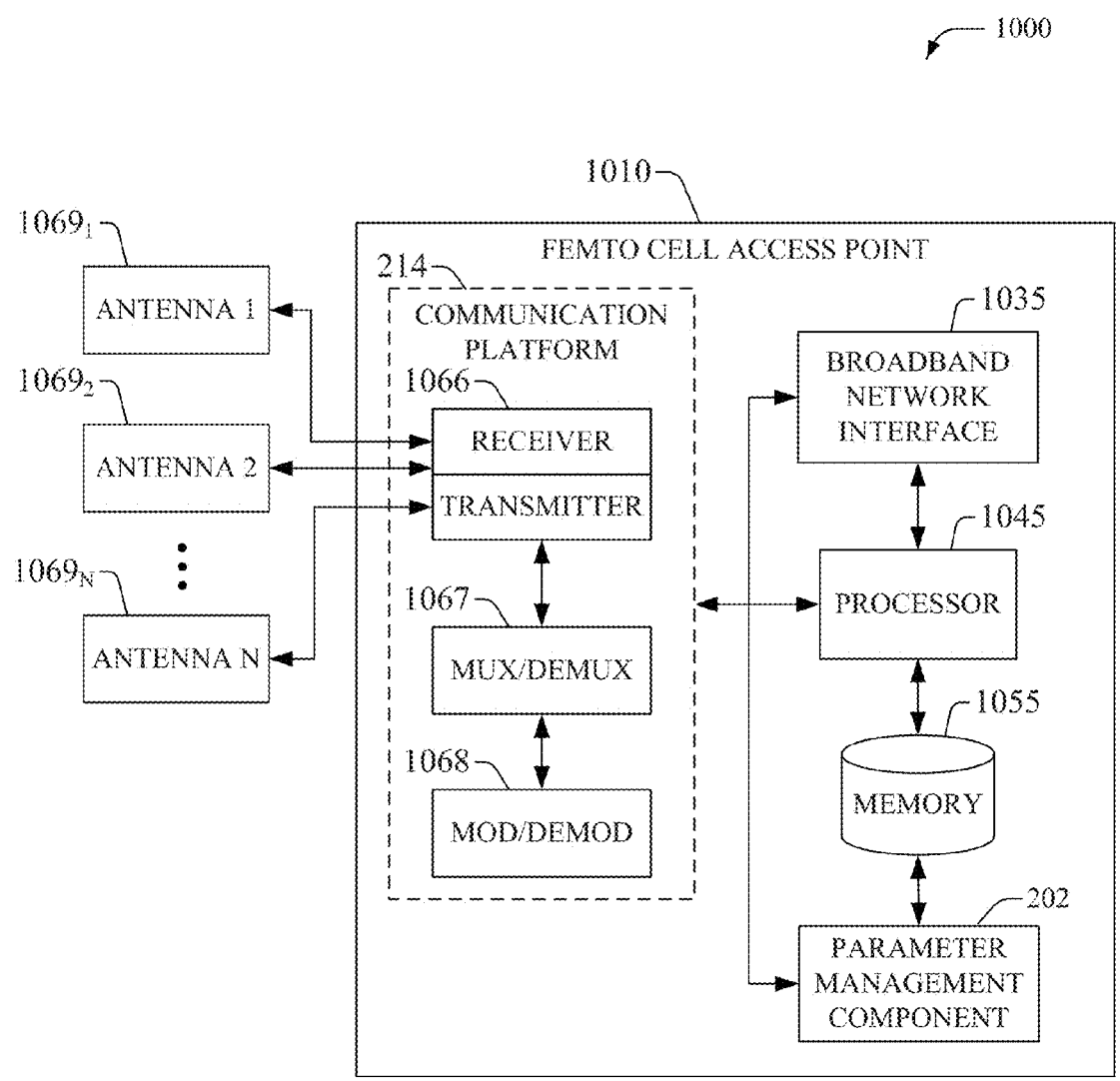
FIG. 10 illustrates an example embodiment of a femto access point that can exchange operating parameters with nearby femtocells, according to the subject disclosure.

To provide further context for various aspects of the subject specification, FIGS. 9 and 10 illustrate, respectively, an example wireless communication environment 900, with associated components for operation of a femtocell, and a block diagram of an example embodiment 1000 of a femto access point, which can utilize operating parameter(s) from a nearby FAP, during initial set-up, in accordance with aspects described herein.

Wireless communication environment 900 includes two wireless network platforms: (i) A macro network platform 910 that serves, or facilitates communication) with user equipment 975 via a macro radio access network (RAN) 970. It should be appreciated that in cellular wireless technologies (e.g., 3GPP UMTS, HSPA, 3GPP LTE, 3GPP UMB), macro network platform 910 is embodied in a Core Network. (ii) A femto network platform 980, which can provide communication with UE 975 through a femto RAN 990 linked to the femto network platform 980 via backhaul pipe(s) 985, wherein backhaul pipe(s) are substantially the same a backhaul link 840. It should be appreciated that femto network platform 980 typically offloads UE 975 from macro network, once UE 975 attaches (e.g., through macro-to-femto handover, or via a scan of channel resources in idle mode) to femto RAN.

It is noted that RAN includes base station(s), or access point(s), and its associated electronic circuitry and deployment site(s), in addition to a wireless radio link operated in accordance with the base station(s). Accordingly, macro RAN 970 can comprise various coverage cells like cell 805, while femto RAN 990 can comprise multiple femtocell access points. As mentioned above, it is to be appreciated that deployment density in femto RAN 990 is substantially higher than in macro RAN 970.

Generally, both macro and femto network platforms 910 and 980 can include components, e.g., nodes, gateways, interfaces, servers, or platforms, that facilitate both packet-switched (PS) and circuit-switched (CS) traffic (e.g., voice and data) and control generation for networked wireless communication. For example, macro network platform 910 includes CS gateway node(s) 912 which can interface CS traffic received from legacy networks like telephony network(s) 940 (e.g., public switched telephone network (PSTN), or public land mobile network (PLMN)) or a SS7 network 960. Moreover, CS gateway node(s) 912 interfaces CS-based traffic and signaling and gateway node(s) 918.

In addition to receiving and processing CS-switched traffic and signaling, gateway node(s) 918 can authorize and authenticate PS-based data sessions with served (e.g., through macro RAN) wireless devices. Data sessions can include traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. It should be further appreciated that the packetized communication can include multiple flows that can be generated through server(s) 914. Macro network platform 910 also includes serving node(s) 916 that convey the various packetized flows of information, or data streams, received through gateway node(s) 918. It is to be noted that server(s) 914 can include one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can include business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960.

Femto gateway node(s) 984 have substantially the same functionality as PS gateway node(s) 918. Additionally, femto gateway node(s) 984 can also include substantially all functionality of serving node(s) 916. In an aspect, femto gateway node(s) 984 facilitates handover resolution, e.g., assessment and execution. Server(s) 982 have substantially the same functionality as described in connection with server(s) 914 and can include one or more processor configured to confer at least in part the functionality of macro network platform 910. Moreover, the server(s) 982 and/or server(s) 914 can include at least one server substantially similar to network node 402, described in detail supra. To that end, the one or more processor can execute code instructions stored in memory 986, for example.

Memory 986 can include information relevant to operation of the various components of femto network platform 980. For example operational information that can be stored in memory 986 can comprise, but is not limited to, location of deployed femtocells, subscriber information; contracted services; maintenance and service records; femtocell configuration (e.g., devices served through femto RAN 990; access control lists, or white lists); service policies and specifications; privacy policies; add-on features; and so forth With respect to FIG. 10, in example embodiment 1000, femtocell AP 1010 can receive and transmit signal(s) (e.g., traffic and control signals) from and to wireless devices, access terminals, wireless ports and routers, etc., through a set of antennas $1069_1$-$1069_N$. It should be appreciated that while antennas $1069_1$-$1069_N$ are a part of communication platform 214, which comprises electronic components and associated circuitry that provides for processing and manipulating of received signal(s) (e.g., a packet flow) and signal(s) (e.g., a broadcast control channel) to be transmitted. Moreover, FAP 1010 is substantially similar to $FAP_A$ 102, and/or $FAP_B$ 106 and can include functionally, as more fully described herein, for example, with regard to systems 100-400.

In an aspect, communication platform 214 includes a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

FAP 1010 also includes a processor 1045 configured to confer functionality, at least partially, to substantially any electronic component in the FAP 1010, in accordance with aspects of the subject innovation. In particular, processor 1045 can facilitate FAP 1010 to implement configuration instructions received through communication platform 1025, which can include storing data in memory 1055. In addition, processor 1045 facilitates FAP 1010 to process data (e.g., symbols, bits, or chips) for multiplexing/demultiplexing, such as effecting direct and inverse fast Fourier transforms, selection of modulation rates, selection of data packet formats, inter-packet times, etc. Moreover, processor 1045 can manipulate antennas $1069_1$-$1069_N$ to facilitate beamforming or selective radiation pattern formation, which can benefit specific locations (e.g., basement, home office . . . ) covered by FAP; and exploit substantially any other advantages associated with smart-antenna technology. Memory 1055 can store data structures, code instructions, system or device information like device identification codes (e.g., IMEI, MSISDN, serial number . . . ) and specification and/or operating parameters, such as, but not limited to, multimode capabilities; code sequences for scrambling; spreading and pilot transmission, floor plan configuration, access point deployment and frequency plans; and so on. In addition, memory 1055 can store information such as schedules and policies; FAP address(es) or geographical indicator(s); access lists (e.g., white lists); license(s) for utilization of add-features for FAP 1010, and so forth.

In embodiment 1000, processor 1045 is coupled to the memory 1055 in order to store and retrieve information necessary to operate and/or confer functionality to communication platform 1025, broadband network interface 1035 (e.g., a broadband modem), and other operational components (e.g., multimode chipset(s), power supply sources . . . ; not shown) that support femto access point 1010. The FAP 1010 can further include a parameter management component 202, which can include functionality, as more fully described herein, for example, with regard to systems 100-300. It is to be noted that the various aspects disclosed in the subject specification can also be implemented through (i) program modules stored in a computer-readable storage medium or memory (e.g., memory 986 or memory 1055) and executed by a processor (e.g., processor 1045), or (ii) other combination(s) of hardware and software, or hardware and firmware.

Figure 11:
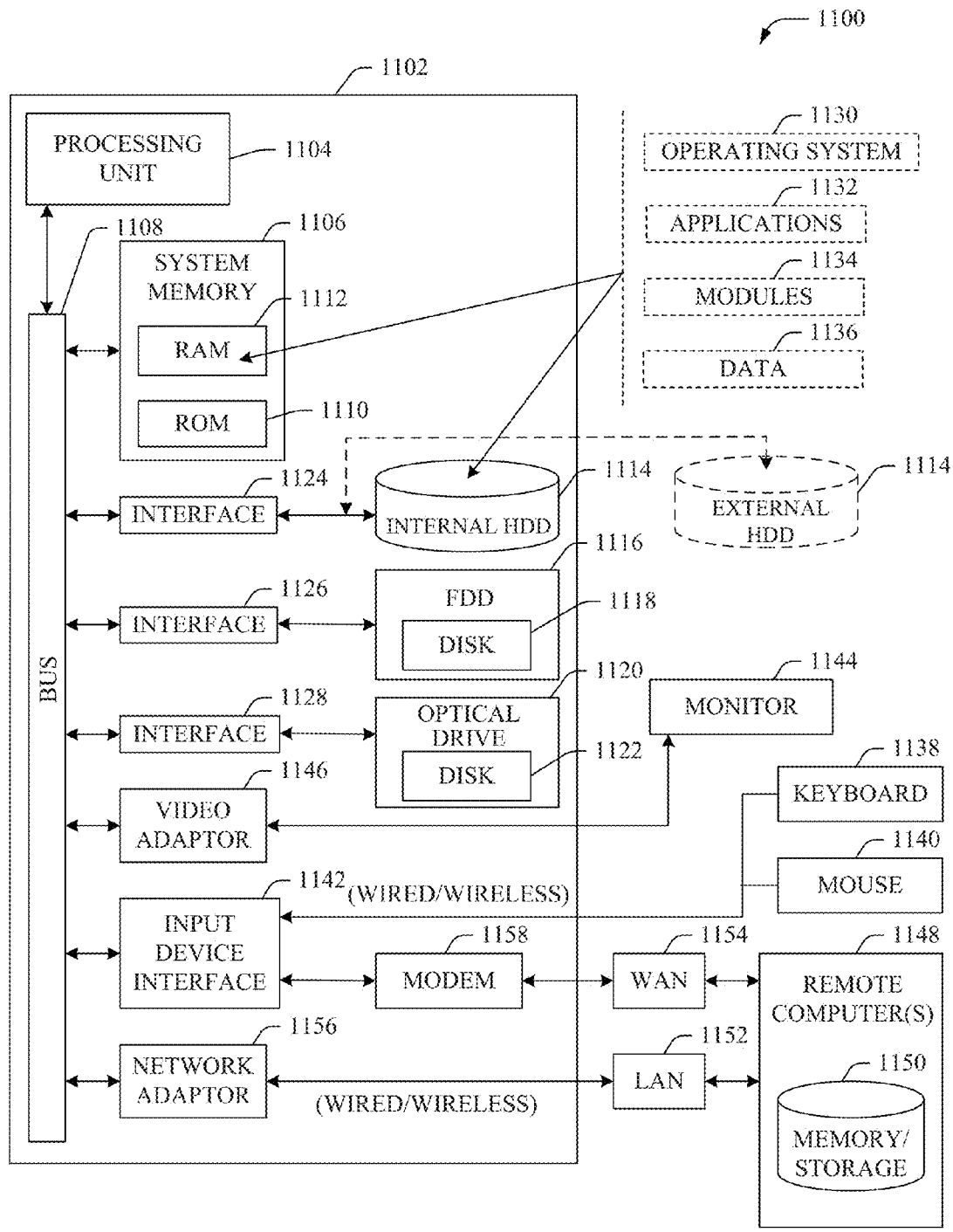
FIG. 11 illustrates a block diagram of a computer operable to execute the disclosed communication architecture.

Referring now to FIG. 11, there is illustrated a block diagram of a computer operable to execute the disclosed communication architecture. In order to provide additional context for various aspects of the subject specification, FIG. 11 and the following discussion are intended to provide a brief, general description of a suitable computing environment 1100 in which the various aspects (e.g., FAP, network node, etc.) of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various aspects of the specification includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), which internal hard disk drive 1114 can also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations includes at least one or both of Universal Serial Bus (USB) and IEEE 1394 interface technologies. Other external drive connection technologies are within contemplation of the subject specification.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods of the specification.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the specification can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE 1394 serial port, a game port, a USB port, an IR interface, etc.

A monitor 1144 or other type of display device is also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 is connected to the local network 1152 through a wired and/or wireless communication network interface or adapter 1156. The adapter 1156 can facilitate wired or wireless communication to the LAN 1152, which can also include a wireless access point disposed thereon for communicating with the wireless adapter 1156.

When used in a WAN networking environment, the computer 1102 can include a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are example and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a memory that stores executable instructions; and
a processor, coupled to the memory, that facilitates execution of the executable instructions to perform operations, comprising:
receiving an indication that a first femto access point device is being provisioned, according to a provisioning procedure, to provide a communication service;
in response to the receiving, identifying other femto access point devices previously provisioned and configured to operate according to operating parameter data that is configured during an operating parameter configuration period;
selecting a second femto access point device from the other femto access point devices based on timing data indicative of the operating parameter configuration period during which the operating parameter data has been customized to modify an operating parameter that affects a provisioned service provided by the second femto access point device; and
facilitating a transmission of the operating parameter data to the first femto access point device to facilitate the provisioning procedure of the first femto access point device.

2. The system of claim 1, wherein the operating parameter is a power control parameter that specifies a transmission power associated with a signal transmitted by the second femto access point device.

3. The system of claim 1, wherein the operating parameter is a mobility control parameter that specifies a threshold associated with a network transfer related to the second femto access point device.

4. The system of claim 1, wherein the operating parameter is an access control parameter that specifies an access restriction associated with the second femto access point device.

5. The system of claim 1, wherein the operating parameter is an admission control parameter that specifies an allocation of bandwidth associated with the second femto access point device.

6. The system of claim 1, wherein the selecting comprises selecting the second femto access point device in response to determining that performance data indicative of a performance of the second femto access point device satisfies a defined performance criterion.

7. The system of claim 1, wherein the operations further comprise:
based on classification data representing a classification assigned to the first femto access point device, determining profile data indicative of a pre-provisioned parameter profile, and
directing the profile data to the first femto access point device to facilitate the provisioning procedure.

8. The system of claim 7, wherein the classification data is determined based on signal strength data that represents signal strengths of respective macro signals transmitted by respective macro access point devices that are located within a defined distance from the first femto access point device.

9. The system of claim 1, wherein the selecting comprises selecting the second femto access point device in response to determining that location data representing a location of the second femto access point device satisfies a defined location criterion.

10. The system of claim 9, wherein the determining comprises determining that the second femto access point device is located within a specified distance from the first femto access point device.

11. The system of claim 1, wherein the selecting comprises selecting the second femto access point device in response to receiving, from the first access point device, request data indicative of a request for the operating parameter data.

12. A method, comprising:
determining, by a system comprising a processor, that a first femto access point device is being provisioned according to a provisioning process to provide communication service;
in response to the determining that the first femto access point device is being provisioned, determining, by the system, parameter data representing an operating parameter utilized by another femto access point device to provide provisioned service, wherein the other femto access point device was provisioned and has been configured to operate according to the parameter data that was customized during an operating parameter customization period;
selecting, by the system, the other femto access point device based on timing data indicative of the operating parameter customization period during which the operating parameter data was determined to have been customized to modify the operating parameter to affect the provisioned service provided by the other femto access point device; and
facilitating, by the system, a transmission of the parameter data to the first femto access point device to facilitate the provisioning process of the first femto access point device.

13. The method of claim 12, further comprising:
selecting, by the system, the other femto access point device in response to determining that location data representing a location of the other femto access point device satisfies a defined location criterion.

14. The method of claim 12, further comprising:
selecting, by the system, the other femto access point device in response to determining that performance data indicative of a performance of the other femto access point device satisfies a defined performance criterion.

15. The method of claim 12, further comprising:
selecting, by the system, the other femto access point device based on capability data indicative of a call handling capability of the other femto access point device.

16. The method of claim 12, further comprising:
selecting, by the system, the other femto access point device based on failure data indicative of a call failure rate of the other femto access point device.

17. The method of claim 12, further comprising:
selecting, by the system, the other femto access point device based on comparing first radio environment data representing a first radio environment of the first femto access point device with other radio environment data representing another radio environment of the other femto access point device.

18. A non-transitory computer readable medium comprising executable instructions that, in response to execution, cause a system comprising a processor to perform operations, comprising:
receiving an indication associated with a provisioning of a first femto access point device to provide communication service;
in response to the receiving the indication, identifying femto access point devices that were previously provisioned and customized to operate according to operating parameter data that is configured during a configuration period;
receiving, from a second femto access point device of the femto access point devices, the operating parameter data representing an operating parameter that is utilized by the second femto access point device to provide provisioned service and is configured during the configuration period, wherein the second femto access point device is selected based on timing data indicative of the configuration period during which the operating parameter data is determined to have been customized to modify the operating parameter that affects provisioned service provided by the second femto access point device; and
directing, to the first femto access point device, the operating parameter data to facilitate the provisioning of the first femto access point device.

19. The non-transitory computer readable medium of claim 18, wherein the receiving comprises receiving the parameter data subsequent to receiving, from the first access point device, request data indicative of a request for the operating parameter data.

20. The non-transitory computer readable medium of claim 18, wherein the second femto access point device is selected based on policy data indicative of a defined selection policy.

* * * * *